UNITED STATES PATENT OFFICE.

OSCAR L. PETERSON, OF DANIELSON, CONNECTICUT.

SPECK-DYE COMPOSITION.

1,386,201.    Specification of Letters Patent.    Patented Aug. 2, 1921.

No Drawing.    Application filed October 28, 1920. Serial No. 420,306.

*To all whom it may concern:*

Be it known that I, OSCAR L. PETERSON, a citizen of the United States, residing at Danielson, in the county of Windham and State of Connecticut, has invented certain new and useful Improvements in Speck-Dye Composition, of which the following is a specification.

This invention relates to a speck dye, and particularly to a paste composition for dyeing specks in woolens.

My dye is applied on the cloth in the process of manufacture (*i. e.*, in the finishing department) and has as its object the dyeing of any foreign substance, such as vegetable matter, etc., which is found in the wool. For example: sheep, when grazing or roaming about, get into briars, burs, etc., and such particles stick to their wool. When this wool is sheared from the sheep and sold to the woolen mills, there will be found some of this foreign or vegetable matter adhering to the wool.

After the wool has been carded, spun and woven in the woolen mills, there still crops up some of this foreign or vegetable matter in the cloth, making what is known as "specks" or "shives" in the cloth. These "specks" or "shives," which stand out very white and prominent in the cloth, must be covered up or picked out by hand in the finishing department of the woolen mill. The last-mentioned process takes altogether too much time, hence the former method is used, *i. e.*, covering up the "specks" or "shives."

There are upon the market at present several different "speck dyes" to perform the above duty. They are all prepared in powder form and sold to the woolen mills where they are then boiled up and made into a dye solution and applied to the cloth to cover up the "specks" or "shives."

I have invented a "speck dye" in paste form, instead of powder. It is much easier to prepare for application to the cloth in the mill than the powder; it is less expensive; it is more concentrated; it can be made as strong as is desired, whereas the powder dyes can reach only a certain maximum of strength, while my dye is necessarily prepared from an original formula.

Following is a statement of the ingredients used and the steps necessary to produce my "speck dye paste":

Grind 4.6 lbs. sodium chlorid, 3 lbs. copper sulfate, $\frac{1}{10}$ lb. tartar emetic into powder. The resulting powder, together with 9.2 lbs. of alkali is then dissolved in 27.7 lbs. boiling water. This boiling liquid is then mixed with 55.4 lbs. hematin paste, (hematin paste is an extract of logwood.) After allowing this mixture to cool to from three to five hours, the result gives 100 lbs. of speck dye paste.

It is to be noted that the proportion of the ingredients specified bear a percentage relation to the 100 pounds of composition made, the proportions of the ingredients used total 100 pounds, or 100 per cent. combination, and I, therefore, set forth this percentage basis of the ingredients used as bearing to 100 per cent. or 100 pounds in the appended claims.

What I claim is:

1. A dyeing composition comprising 4.6 per cent. sodium chlorid, 3 per cent. copper sulfate, 1 per cent. tartar emetic, 9.2 per cent. alkali, 27.7 per cent. water, and 55.4 per cent. hematin paste.

2. A dyeing composition comprising approximately sodium chlorid $1\frac{1}{2}$ parts, copper sulfate 1 part, tartar emetic $\frac{1}{10}$ part, water 9 parts, and hematin paste 18 parts.

3. A process for preparing a dyeing composition comprising grinding sodium chlorid, copper sulfate, and tartar emetic into powder, then mixing said powder together with an alkali and then dissolving same in boiling water, mixing this boiling liquid-mixture with hematin paste, and then allowing the entire mixture to cool.

In testimony whereof I hereunto affix my signature.

OSCAR L. PETERSON.